March 5, 1963 F. E. SWAIN 3,080,145
BUTTERFLY VALVES
Filed Oct. 20, 1958

INVENTOR
FRANK E. SWAIN
Morris Bateman
ATTORNEYS

United States Patent Office 3,080,145
Patented Mar. 5, 1963

1

3,080,145
BUTTERFLY VALVES
Frank Edward Swain, Kirby Muxloe, near Leicester, England, assignor to David F. Wiseman & Sons Limited, Birmingham, England, a British company
Filed Oct. 20, 1958, Ser. No. 768,418
Claims priority, application Great Britain Oct. 24, 1957
1 Claim. (Cl. 251—306)

This invention relates to improvements in butterfly valves and more specifically has reference to butterfly valves of the kind described and claimed in the specification of application Serial No. 479,923 filed January 5, 1955, now refiled as a continuation application Serial No. 29,556 filed May 12, 1960, and now Patent No. 3,025,035, wherein a radially expansible seating ring is freely mounted in the bore of the valve body and is adapted for co-action with a part-spherical closure member to provide an effective seal.

In the prior specification the valve closure member was mounted for rocking movement about an axis which is disposed in a plane parallel with but axially offset from the plane containing the seating ring in order that the bearings of the shaft which carries the closure member should be spaced outside the seating ring. The present invention has for its object to provide an improved or modified valve construction wherein the closure member, in its closed position, is disposed in the plane of the seating ring but wherein the bearings for the closure member are still spaced away from the seating ring.

The present invention resides in a butterfly valve which consists of an improvement in or modification of the butterfly valve described in the specification of application Serial No. 29,556 and comprises a closure member mounted in the bore of the valve body for rotation about an axis which is inclined to the plane of a radially expansible seating ring mounted in a recess in the valve body for sealing engagement with the periphery of the closure member whereby the bearings which support the closure member are disposed one on each side of the seating ring.

Figure 1:
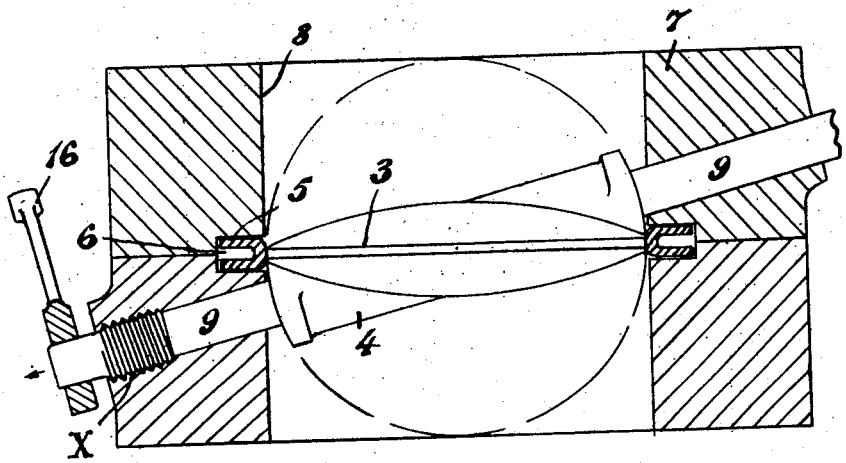
Figure 2:
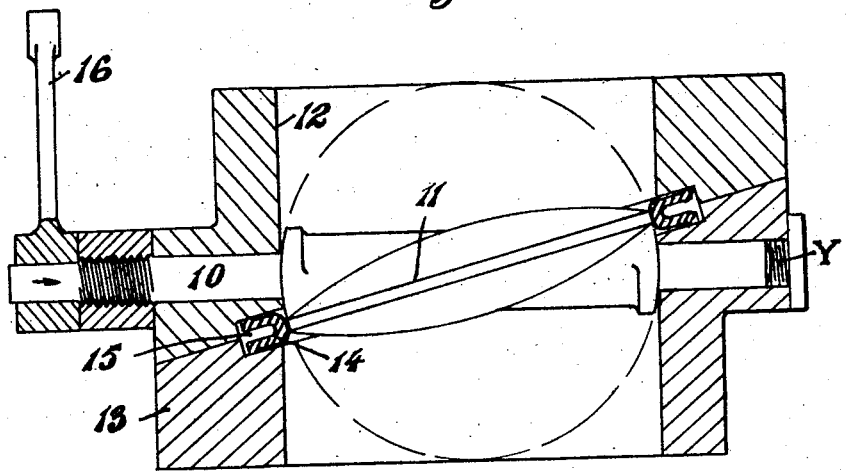

Means for carrying the present invention into practice will now be described with reference to the accompanying drawings, wherein:

FIGURE 1 is a part sectional plan view of a butterfly valve assembly in accordance with the invention, and FIGURE 2 is a part sectional plan view of an alternative embodiment of the invention.

In the embodiment of the invention illustrated in FIGURE 1 the closure member comprises a circular plate 3 having a generally bi-convex shape instead of the part-spherical closure member described in the prior specification, and is provided with a part spherical sealing edge. The closure member is formed on a diameter thereof with an integral cylindrical housing 4 for the reception therethrough of the shaft mounting of the closure member and according to this invention the axis of this housing 4 is angularly offset in a plane normal to the plane containing the sealing edge of the closure member 3, the centre of the axis of the shaft housing being co-incident with the centre of the closure member so that the ends of the centre of the closure member so that the ends of the housing open one on each opposite side of the plane of the closure member.

The peripheral edge of the closure member co-acts with a radially expansible seating ring 5 mounted in a recess 6 formed in the body 7 of the valve in a plane at right angles to the axis of the bore 8 of the valve body, and the shaft 9 of the closure member is mounted in bearings disposed on a line passing at an angle of say about 15 degrees to the plane containing the seating ring.

In an alternative embodiment of the invention illustrated in FIGURE 2 the mounting shaft 10 of the closure member 11 is located in a plane at right angles to the axis of the bore 12 of the valve body 13 and the resilient seating ring 14 is mounted in a recess 15 in the valve body in a plane which is offset by about 15 degrees to the shaft 10 in a similar manner to that of the previously described embodiment so that here again the shaft bearings are located one on each opposite isde of the seating ring.

The shaft mounting of the closure member is provided with a control lever 16 or the like for effecting the rocking of the closure member.

In operation the rotation of the closure member through 90 degrees from its open position to its closed position and the consequent engagement of the closure member with the ring will effect the radial expansion of the seating ring within its mounting recess whereby a tight seal is obtained between the periphery of the closure member and the seating ring in a similar manner to that described in the prior specification.

By virtue of the offset position of the plane of the closure member relative to its shaft mounting it will be appreciated that the pressure of fluid present in the valve housing on one side of the closure member will result in a force component along the shaft mounting of the closure member. This force component is resisted for example by means of a screw threaded engagement of the shaft 9 with the valve body 7 as illustrated at X in FIGURE 1, or by the use of thrust bearings as illustrated at Y in FIGURE 2.

The ring employed in the valve hereinbefore described is generally of the kind described in the prior specification and is adapted to be radially expanded when engaged by the closure member. With a view to providing a limited degree of resilience in the ring in its axial direction the ring may be modified as shown in the drawings accompanying the present specification by the provision in its outer face of a recess giving a somewhat U-shaped section to the ring to admit of a limited axial movement of the internal edge of the ring relative to its web-like sides. In practice the ring is mounted in its recess in the valve body with the sides of the ring slightly compressed. Alternatively the ring may be of L-section with one limb mounted in the annular recess in the valve body with provision for floating movement, and with the second limb projecting forwardly towards the valve plate with provision for radial expansion of the mouth of the ring when engaged by the valve body.

The resiliently expansible seating ring is mounted in its recess in the valve body by splitting the valve body in a plane containing the recess, the two parts of the valve body being secured together by say bolts.

I claim:

In a butterfly valve, a valve body having a flow passageway therethrough, a closure member having a continuous periphery, a shaft mounting said closure member for pivotal movement about a fixed axis that extends across the passageway, said body having a continuous internal peripheral recess that is disposed in a plane which extends across the passageway and is angularly offset relative to said pivot axis of the closure member so that said pivot axis passes through the plane of said recess, means mounting said shaft in bearing means in said body at laterally opposite sides of said passageway, said bearing means being spaced from said recess and being located respectively on the upstream and downstream sides of said closure member, thrust means resisting longitudinal displacement of the shaft due to force components derived from line fluid acting on the closure member, a continuous resilient seating ring freely mounted for radial movement in said recess, and means for rotating said closure member between a fully open position and a fully closed position where the closure member is peripherally elastically seated within said seating ring.

References Cited in the file of this patent

UNITED STATES PATENTS

| | | | |
|---|---|---|---|
| Re. 17,022 | Wilson | July 3, | 1928 |
| 1,318,001 | Upson | Oct. 7, | 1919 |
| 1,871,299 | Bragg | Aug. 9, | 1932 |
| 1,977,351 | Phillips | Oct. 16, | 1934 |
| 2,058,996 | Kollberg | Oct. 27, | 1936 |
| 2,754,846 | Ray | July 17, | 1956 |
| 2,761,709 | Gilbert | Sept. 4, | 1956 |
| 2,809,662 | Ray | Oct. 15, | 1957 |
| 2,882,010 | Bryant | Apr. 14, | 1959 |
| 2,893,682 | Hintzman | July 7, | 1959 |
| 2,934,312 | Stevens | Apr. 26, | 1960 |
| 3,025,035 | Swain | Mar. 13, | 1962 |